United States Patent Office 3,494,902
Patented Feb. 10, 1970

3,494,902
ETHYLENE POLYMER RECOVERY PROCESS
Rajindar K. Kochhar, Overland Park, Kans., assignor to Gulf Research & Development Company, Pittsburgh, Pa., a corporation of Pennsylvania
No Drawing. Filed Oct. 17, 1966, Ser. No. 586,925
Int. Cl. C08f 1/92
U.S. Cl. 260—86.7                                     6 Claims

ABSTRACT OF THE DISCLOSURE

Self-emulsifiable ethylene-alkyl acrylate polymer solids are recovered by a coagulation process from an aqueous dispersion of such solids by the addition thereto of an alkali metal salt.

---

This invention relates to an improved process for the recovery of ethylene polymer solids from stable aqueous dispersions of such solids. In another aspect, this invention relates to a coagulation process for the recovery of self-emulsifiable ethylene-alkyl acrylate polymer solids from stable aqueous dispersions of such polymer solids.

In the preparation of water-insoluble, self-emulsifiable ethylene-alkyl acrylate polymers, a suitable process comprises hydrolyzing in the presence of water an ethylene-alkyl acrylate thermoplastic polymer, utilizing an alkali hydroxide and, optionally, a nitrogeneous base, to produce a stable aqueous dispersion of the ethylene polymer. The hydrolysis reaction produces a polymer wherein at least a self-emulsifiable portion of the acrylate groups are in hydrophilic form. Heretofore, the solids have been recovered from the dispersions by coagulation with water-miscible non-solvents such as acetone or by employing inorganic salts of polyvalent cations to coagulate the dispersed solids. Obviously, the use of acetone in a commercial process in large quantities with attendant process losses in the recovery of the polymer solids is not economically feasible.

The polymer product recovered from an aqueous dispersion of such polymer solids using a salt containing polyvalent ions as the coagulating or precipitating agent is of different composition than the polymer solids in the dispersions and has different properties such as, for example, lower melt flow and poor processibility. The coagulated solids obtained with the use of polyvalent ions are also incapable of being redispersed in water.

Accordingly, an object of my invention is to provide an improved process for the recovery of water-insoluble, self-emulsifiable ethylene-alkyl acrylate polymers from stable aqueous dispersions of such polymers.

Another object of my invention is to provide an improved process for the recovery of self-emulsifiable ethylene-alkyl acrylate polymers from stable aqueous dispersions of such polymers, each of said polymers having a portion of the acrylate groups in alkali metal salt form.

Yet another object of my invention is to provide an improved process for the recovery of ethylene-alkyl acrylate polymers from stable aqueous dispersions of such polymers, each of said polymers having a self-emulsifiable portion of the acrylate groups in alkali metal salt and/or amide form.

Other objects, advantages, and features of my invention will be readily apparent to those skilled in the art from the following description and the appended claims.

By the invention, self-emulsifiable ethylene-alkyl acrylate polymer solids wherein a portion of the acrylate groups are in alkali metal salt form are recovered from stable aqueous dispersions of said solids by contacting the aqueous dispersions with an alkali metal salt of an organic or inorganic acid at an elevated temperature. The alkali metal of the coagulating salt is the same alkali metal present in the acrylate groups. The ethylene-alkyl acrylate polymer solids are coagulated or precipitated from the aqueous medium and are readily separated from the aqueous medium by conventional filtration means, or the like. The composition of the recovered polymer solids is substantially the same as the composition of the solids dispersed in the aqueous medium.

"Water-insoluble" as used herein refers to the inability of the fused solid ethylene-alkyl acrylate polymer to become substantially dissolved in water as measured, for example, by preparing a one-half mil cast film of the polymer by conventional methods, placing a 10 x 10 centimeter sample in one liter of water maintained at a temperature of 30° C. for a period of 24 hours, removing the film from the water, drying the film to a constant weight at 120° C. and determining that the weight loss in the film when compared to the weight of the original film sample shall be less than 10 weight percent. "Self-emulsifiable" as used herein refers to that property of the polymer whereby one gram of the polymer in particulate form can be readily dispersed in 100 ml. of water in a stirred metal autoclave maintained at a temperature in the range of 180 to 300° C. to provide, in the absence of an emulsifying agent, shelf-stable aqueous dispersion wherein the average particle size is less than two microns.

Although not to be limited thereto, the invention has been found to be particularly applicable to the separation and recovery of ethylene-alkyl acrylate polymer solids from stable aqueous dispersions of such solids wherein the aqueous dispersion have been prepared by the hydrolyis of a thermoplastic ethylene-alkyl acrylate polymer in an aqueous medium utilizing an alkali hydroxide and, optionally, a nitrogenous base to hydrolyze a portion or whole of the acrylate groups to the carboxylate salt, acid, and, optionally, amide form. The ethylene-alkyl acrylate polymers which can be hydrolyzed to provide aqueous dispersions of water-insoluble, self-emulsifiable ethylene-alkyl acrylate polymers can be those polymers described by George E. Ham, Harry D. Anspon, and William H. Byler in copending application Ser. No. 335,732, filed Jan. 6, 1964, and now U.S. Patent 3,350,372. The polymers subjected to the hydrolysis reaction can be those ethylene-alkyl acrylate polymers in which the alkyl acrylate can be an alkyl ester of unsubstituted acrylic acid or a simple alpha-substituted acrylic acid, such as methacrylic acid. The ethylene alkyl acrylate polymer employed as the starting material in the hydrolysis reaction can be of a highly uniform character or of a non-uniform character in so far as the alkyl acrylate groups are evenly or randomly distributed throughout the polymeric chains. Presently preferred polymers employed as starting materials in the hydrolysis reaction are the ethylene-lower alkyl acrylate copolymers, especially those of the lower alkyl esters of unsubstituted acrylic acids such as methyl acrylate.

The ethylene-alkyl acrylate copolymers can be hydrolyzed by the process described in copending application Ser. No. 131,108, filed by Jack Hurst and Harry D. Anspon on Aug. 14, 1961. As described therein, an ethylene-alkyl acrylate copolymer is hydrolyzed to form a water-insoluble, self-emulsifiable ethylene polymer wherein at least a portion of the acrylate groups are in carboxylate salt form by contacting the thermoplastic polymer in an aqueous medium with an alkali hydroxide and, optionally, a nitrogenous base. The product of the hydrolysis reaction comprises a water-insoluble, self-emulsifiable ethylene polymer dispersed throughout the aqueous medium.

The inventive process is applicable to the recovery of self-emulsifiable ethylene-alkyl acrylate polymer solids from stable dispersions of such solids wherein at least a portion of the acrylate groups of the copolymer are in alkali metal salt form. The inventive process is also applicable to the recovery of ethylene-alkyl acrylate polymer solids from dispersions of such solids wherein additional portions of the acrylate groups of the copolymer are in the amide and, optionally, acid and/or ester form. The ethylene-alkyl acrylate polymer solids of the dispersions are selected from those ethylene-alkyl acrylate polymers wherein the alkyl acrylate concentration is in the range of about 0.01 to about 0.5 (preferably, 0.025 to about 0.25) mol of acrylate groups per mol of contained ethylene groups. Thus, with reference below to the definitions of units (a) through (e), the water-insoluble, but self-emulsifiable ethylene-alkyl acrylate polymers are selected from the groups consisting of:

(1) Polymers containing 67–99 (preferably 87–95.2) mol percent of units (a) and, correspondingly, 33–1 (preferably 13.0–4.8) mol percent of units (b), (2) Polymers containing 67–99 (preferably 87–95.2) mol percent of units (a) and, correspondingly, 33–1 (preferably 13.0–4.8) mol percent of a mixture of units (b) and (c), (3) Polymers containing 67–99 (preferably 87–95.2) mol percent of units (a), and, correspondingly, 33–1 (preferably 13.0–4.8) mol percent of a mixture of units (b), (c) and (d), (4) Polymers containing 67–99 (preferably 87–95.2) mol percent of units (a) and, correspondingly, 33–1 (preferably 13.0–4.8) mol percent of a mixture of units (b), (c), (d) and (e), (5) Polymers containing 67–99 (preferably 87–95.2) mol percent of units (a) and, correspondingly, 33–1 (preferably 13.0–4.8) mol percent of a mixture of units (b) and (d), (6) Polymers containing 67–99 (preferably 87–95.2) mol percent of units (a) and, correspondingly, 33–1 (preferably 13.0–4.8) mol percent of a mixture of units (b) and (e), (7) Polymers containing 67–99 (preferably 87–95.2) mol percent of units (a) and, correspondingly, 33–1 (preferably 13.0–4.8) mol percent of a mixture of units (b), (c) and (e), (8) Polymers containing 67–99 (preferably 87–95.2) mol percent of units (a) and, correspondingly, 33–1 (preferably 13.0–4.8) mol percent of a mixture of units (b), (d) and (e), and (9) Mixtures of (1), (2), (3), (4), (5), (6), (7) and (8), said units (a) having the structure $$-CH_2-CH_2-$$

said units (b) having the structure

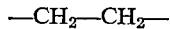

said units (c) having the structure

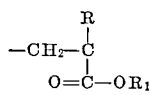

said units (d) having the structure

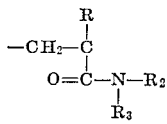

said units (e) having the structure

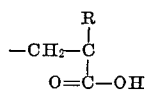

where R is selected from the group consisting of hydrogen and hydrocarbon groups, $R_1$ is an alkali metal, $R_2$ and $R_3$ are independently selected from the groups consisting of hydrogen, hydrocarbon groups, and hydroxyalkyl groups, and $R_4$ is a hydrocarbon group.

Coagulation or precipitation of the polymer solids contained in the aqueous dispersion is effected by contacting the aqueous dispersion with a salt of the alkali metal of the acrylate groups. The precipitant can be a solid or an aqueous solution of the salt. Although not to be limited thereto, it has been observed that rapid coagulation and precipitation of the polymer solids is effected when the weight of the salt employed is at least 50 weight percent of the polymer solids contained in the dispersion. It will readily be understood by those skilled in the art that the quantity of alkali metal salt employed will vary with the particular salt utilized and the rate of coagulation or precipitation desired. By increasing the quantity of alkali salt utilized in the precipitation or coagulation process, the rate of coagulation is increased.

For ease in handling the coagulated polymer solids and effecting separation of the coagulated polymer solids from the aqueous medium, it is preferred that the concentration of polymer in the aqueous dispersion not exceed ten weight percent. Maintaining the polymer concentration of the aqueous dispersion at or below ten weight percent substantially aids in separation of the coagulated solids from the aqueous medium by filtration, centrifugation or the like. It is, of course, within the scope of this invention to precipitate or coagulate polymer solids from aqueous dispersions of such solids wherein the solids concentration is substantially higher than ten weight percent. However, the resulting mixture of coagulated solids and aqueous medium is quite often so highly viscous as to cause difficulty in the separation of the coagulated or precipitated solids from the aqueous medium.

The precipitation step is conducted at an elevated temperature. Preferably, the temperature of the aqueous medium is maintained in the range of 50–100° C. with the coagulation process conducted at atmospheric pressure. It will be understood by those skilled in the art that with increased pressures higher temperatures can be employed. Accelerated coagulation rates are obtained when the precipitation process is conducted at a temperature in the range of 80°–100° C.

The coagulated or precipitated solids produced by the invention are readily redispersed in an aqueous medium by the utilization of an elevated temperature, an alkali hydroxide and/or a nitrogenous base.

The following examples are presented as illustrative of the objects and advantages of the invention. However, it is not intended that the invention should be limited to the specific embodiments presented therein.

EXAMPLE I

In this example the effectiveness of the invention to coagulate the dispersed solids of a stable aqueous dispersion of an ethylene-methyl acrylate polymer containing pendant sodium carboxylate, amide and acid groups is demonstrated. The shelf-stable aqueous dispersion employed in this example contains 22.8 weight percent solids, has a pH of 10.25 and a Brookfield viscosity of 250 centipoises. Analysis of the dispersed copolymer indicates that: sodium comprises 2.65 weight percent of the copolymer, nitrogen comprises 1.05 weight percent of the copolymer, and 0.53 weight percent of the copolymer comprises methyl acrylate ester. The polymer has an acid equivalent of 0.205/100 g.

250 grams of the above described aqueous dispersion is diluted with 250 ml. of water. The diluted dispersion is contacted with 250 ml. solution of 25 grams of sodium chloride. With constant stirring of the diluted aqueous dispersion, the combined mixture is heated to the boiling temperature, cooled and left standing overnight.

The polymer solids coagulated are filtered from the colorless liquid. Analysis, after the coagulated polymer solids have been washed with water, indicates that the recovered polymer has a sodium concentration equivalent to the sodium concentration of the dispersed polymer.

EXAMPLE II

The process of Example I is repeated with the exception that the precipitating solution contains 75 grams of sodium chloride. The coagulation rate is substantially accelerated with the increased sodium chloride concentration. Analysis of the coagulated solids separated from the colorless liquid by filtration shows that the sodium concentration is equivalent to the sodium concentration of the dispersed polymer.

EXAMPLES III

In this example the effectiveness of sodium sulfate as a coagulating agent is demonstrated. 250 grams of the ethylene-methyl acrylate aqueous dispersion of Example I are diluted with 500 ml. of water. The diluted dispersion is contacted at room temperature with a 250 ml. solution containing 25 grams of sodium sulfate. The mixture is heated to the boiling temperature, cooled and left standing overnight.

Analysis of the resultant coagulated solids filtered from the colorless liquid indicates that the sodium concentration is equivalent to the sodium concentration of the dispersed polymer.

EXAMPLE IV

The procedure of Example III is repeated with the exception that the precipitated solution comprises 50 grams of sodium sulfate dissolved in 350 ml. of water. Analysis of the coagulated polymer solids separated from the colorless liquid indicates that the sodium concentration is equivalent to the sodium concentration of the dispersed polymer solids.

EXAMPLE V

In this example the effectiveness of the invention in the coagulation of the dispersed polymer solids of the ethylene-methyl acrylate aqueous dispersion of Example I utilizing sodium acetate as a coagulating agent is demonstrated. 250 grams of the ethylene-methyl acrylate aqueous dispersion of Example I is diluted with 250 ml. of water. A 350 ml. solution containing 50 grams of sodium acetate is added to the diluted dispersion with constant stirring of the mixture. The resultant mixture is heated to the boiling temperature. The polymer solids coagulated and are separated from the colorless liquid, washed and dried. Analysis of the polymer solids indicates that the sodium concentration is equivalent to the sodium concentration of the dispersed solids.

EXAMPLE VI

In this example the effectiveness of the potassium chloride as a precipitating agent and the criticality of utilizing an elevated temperature is demonstrated. 100 grams of the ethylene-methyl acrylate stable aqueous dispersion of Example I except that sodium was replaced by an equivalent weight of potassium is diluted with 100 ml. of water. The diluted dispersion is contacted with a 200 ml. solution of 22 grams of potassium chloride. The mixture is heated to 45° C., and it is observed that the polymer solids are not fully precipitated. The mixture is then heated to 60-65° C. and maintained at this temperature for one hour. The solids are coagulated and are separated from the colorless liquid by filtration.

EXAMPLE VII

The shelf-stable, self-emulsifiable ethylene-methyl acrylate dispersion employed in this example contains 13.4 weight percent solids, has a pH of 12.45 and a Brookfield viscosity of less than 15 centerpoises. Analysis of the dispersion indicates that potassium comprises 8.62 weight percent of the solids and there are not free carboxyl or ester groups.

300 grams of the above described emulsion is added with stirring to a solution containing 122 grams potassium chloride in 700 ml. of water and maintained at a temperature of 50° C. The mix is then heated to 70-75° C. and immediately filtered to recover the coagulated polymer solids. The polymer after washing and drying, weighs 40 grams and has a composition identical to the composition of the dispersed polymer.

What is claimed is:

1. A process which comprises intimately contacting a stable aqueous dispersion of a self-emulsifiable ethylene-alkyl acrylate polymer having at least a portion of the acrylate groups in alkali metal salt form with an aqueous solution of a salt of the alkali metal present in the acrylate groups, the concentration of said alkali metal salt added to said aqueous dispersion being at least 50 weight percent of the dispersed polymer solids, maintaining the temperature of the resultant mixture at a temperature of at least 50° C., coagulating substantially all of the dispersed polymer solids, and separating therefrom said coagulated solids.

2. The process of claim 1 wherein the coagulation temperature is in the range of 50-100° C. at atmospheric pressure.

3. The process of claim 1 wherein the coagulation temperature is in the range of 80-100° C. at atmospheric pressure.

4. The process of claim 1 wherein the concentration of polymer solids in said aqueous dispersion is not more than 10 weight percent.

5. The process of claim 1 wherein said ethylene-alkyl acrylate polymer contains pendant amide groups.

6. The process of claim 1 wherein said ethylene-alkyl polymer contains pendant carboxyl groups.

References Cited

UNITED STATES PATENTS

| | | | |
|---|---|---|---|
| 3,219,637 | 11/1965 | Stabler et al. | 260—78.5 |
| 3,337,517 | 8/1967 | Anspon | 260—86.7 |
| 3,244,679 | 4/1966 | Schroder et al. | 260—86.1 |
| 3,350,372 | 11/1967 | Ham et al. | 260—86.7 |

OTHER REFERENCES

Thorp: Industrial Chemistry, (pp. 337-341 relied on), New York, The MacMillan Co., 1908.

Morrison and Boyd: Organic Chemistry (p. 496), Boston, Allyn & Bacon, Inc., 1960.

JOSEPH L. SCHOFER, Primary Examiner

J. C. HAIGHT, Assistant Examiner

U.S. Cl. X.R.

260—80.6, 80.73, 80.75, 80.8, 80.81, 86.1, 96